(12) United States Patent
Men

(10) Patent No.: US 12,124,274 B2
(45) Date of Patent: Oct. 22, 2024

(54) LANDING CONTROL METHOD, AIRCRAFT AND STORAGE MEDIUM

(71) Applicant: AUTEL ROBOTICS CO., LTD., Guangdong (CN)

(72) Inventor: Zehua Men, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 362 days.

(21) Appl. No.: 17/660,443

(22) Filed: Apr. 25, 2022

(65) Prior Publication Data

US 2022/0253075 A1     Aug. 11, 2022

Related U.S. Application Data

(63) Continuation of application No. PCT/CN2020/123311, filed on Oct. 23, 2020.

(30) Foreign Application Priority Data

Oct. 25, 2019 (CN) .................. 201911025804.6

(51) Int. Cl.
*G05D 1/00* (2006.01)
*B64C 39/02* (2023.01)
(Continued)

(52) U.S. Cl.
CPC ......... *G05D 1/0676* (2013.01); *B64C 39/024* (2013.01); *G05D 1/0808* (2013.01); *G05D 1/101* (2013.01); *G06T 7/73* (2017.01); *G06V 10/443* (2022.01); *G06V 10/50* (2022.01); *G06V 10/774* (2022.01); *G06V 20/17* (2022.01);
(Continued)

(58) Field of Classification Search
CPC .................................................. G05D 1/0676
See application file for complete search history.

(56) References Cited

U.S. PATENT DOCUMENTS 6,157,876 A     12/2000   Tarleton, Jr. et al.
10,191,496 B2    1/2019   Kim et al.
(Continued)

FOREIGN PATENT DOCUMENTS

CN     1670479 A     9/2005
CN   104006790 A     8/2014
(Continued)

OTHER PUBLICATIONS

PCT International Search Report mailed Jan. 26, 2021; PCT/CN2020/123311 With English Translation.

*Primary Examiner* — Shelley Chen
(74) *Attorney, Agent, or Firm* — Frank Gao, Esq.

(57) ABSTRACT

The embodiments are a landing control method, an aircraft, and a storage medium. The method is applied to the aircraft, and includes: the current frame template image is subjected to image feature extraction, and the extracted image features are used to train the position filter and the scale filter of the first template image; the position information of the first template image in the next frame image is predicted by using the position filter and the scale filter; and the landing of the aircraft is corrected by using the position information, such that the aircraft can dynamically track the preset takeoff and landing point for landing, so as to realize the accurate landing of the aircraft.

16 Claims, 6 Drawing Sheets

(51) Int. Cl.
    *G06T 7/73*         (2017.01)
    *G06V 10/44*      (2022.01)
    *G06V 10/50*      (2022.01)
    *G06V 10/774*     (2022.01)
    *G06V 20/17*      (2022.01)
    *G06V 20/40*      (2022.01)
    *B64U 101/30*     (2023.01)

(52) U.S. Cl.
    CPC .......... *G06V 20/46* (2022.01); *B64U 2101/30* (2023.01); *B64U 2201/20* (2023.01); *G06T 2207/10032* (2013.01); *G06T 2207/20081* (2013.01); *G06T 2207/30252* (2013.01)

(56) References Cited

U.S. PATENT DOCUMENTS

| | | | | |
|---|---|---|---|---|
| 2014/0236398 | A1* | 8/2014 | Zhang | B64D 45/08 701/4 |
| 2023/0027342 | A1* | 1/2023 | Kojima | B64D 45/08 |

FOREIGN PATENT DOCUMENTS

| | | | | | |
|---|---|---|---|---|---|
| CN | 106774423 | A | * | 5/2017 | |
| CN | 107644430 | A | | 1/2018 | |
| CN | 108153334 | A | * | 6/2018 | ............... G05D 1/12 |
| CN | 110001980 | A | * | 7/2019 | ............. B64D 45/08 |
| CN | 110968107 | A | | 4/2020 | |
| CN | 108153334 | B | * | 9/2020 | ............. G05D 1/12 |
| CN | 110001980 | B | * | 11/2021 | ............. B64D 45/08 |
| WO | WO-2020006732 | A1 | * | 1/2020 | |

\* cited by examiner

LANDING CONTROL METHOD, AIRCRAFT AND STORAGE MEDIUM

CROSS REFERENCE

The present application is a continuation of International Application No. PCT/CN2020/123311, filed on Oct. 23, 2020, which claims priority to Chinese patent application No. 201911025804.6, filed on Oct. 25, 2019, which is incorporated herein by reference in its entirety.

BACKGROUND

Technical Field

The present invention relates to the technical field of aircraft control, in particular to a landing control method, an aircraft and a storage medium.

Related Art

With the continuous development of aircrafts, the aircrafts are also applied in more and more fields. An aircraft with a flight function can land according to a landing instruction sent by a terminal. Of course, some intelligent aircrafts have a function of automatic return or one-key landing. At present, the commonly used landing method for an aircraft is to use a GPS (Global Positioning System) to assist in landing, that is, to send GPS coordinates of a target area to the aircraft; and a control system of the aircraft controls the aircraft to land in the target area, and corrects its own landing position according to the GPS coordinates of the target area.

However, due to the lack of the accuracy in the GPS coordinates, the drift of the aircraft, etc., it is difficult for the aircraft to land on a target accurately when landing in this way. Since the positioning accuracy of GPS directly determines the accuracy of precise landing, a large landing error of the aircraft will be caused if a GPS signal is poor.

Therefore, how to control the precise landing of the aircraft has become a hot research issue.

SUMMARY

The main objectives of the present invention are to provide a landing control method, an aircraft and a storage medium, which are directed to better realize the shooting control of the aircraft.

To fulfill said objectives, the present invention provides a landing control method, which is applied to an aircraft. This method includes:
  acquiring a first image of a preset takeoff and landing point collected by the aircraft at a first preset height during a takeoff process, and first attitude information of the aircraft when the first image is collected;
  adjusting, according to the first attitude information, the first image to acquire a first template image of the preset takeoff and landing point;
  acquiring a current frame image of the preset takeoff and landing point collected by the aircraft at a second preset height during a landing process, and second attitude information corresponding to the aircraft when the current frame image is collected, the second preset height being greater than the first preset height;
  adjusting, according to the first template image and the second attitude information, the current frame image to acquire a current frame template image;
  extracting image features of the current frame template image;
  training, by using the image features, a position filter and a scale filter of the first template image;
  predicting, according to the position filter and the scale filter, position information of the first template image in the next frame image of the preset takeoff and landing point; and
  controlling, according to the position information, the aircraft to land such that the aircraft lands to the preset takeoff and landing point.

Preferably, the step of acquiring the first image of the preset takeoff and landing point collected by the aircraft during the takeoff process, and the first attitude information of the aircraft when the first image is collected includes:
  acquiring, at every preset flight height, the first image of the preset takeoff and landing point collected by the aircraft during the takeoff process, and the first attitude information of the aircraft when the first image is collected.

Preferably, the collection of the first image and the first attitude information is stopped when the current flight height of the aircraft is greater than a preset height.

Preferably, the step of adjusting, according to the first attitude information, the first image to acquire the first template image of the preset takeoff and landing point includes:
  generating, according to the first attitude information, a corresponding first adjustment angle;
  adjusting, according to the first adjustment angle, the first image to acquire a first adjusted image; and
  acquiring, according to the first adjusted image, the first template image of the preset takeoff and landing point, wherein the first template image is an image of a preset area in the first adjusted image intercepted with an optical center point of the first adjusted image as a center point.

Preferably, the step of adjusting, according to the first template image and the second attitude information, the current frame image to acquire the current frame template image includes:
  generating, according to the second attitude information, a corresponding second adjustment angle;
  adjusting, according to the second adjustment angle, the current frame image to acquire an adjusted current frame image; and
  acquiring, according to the first template image, the current frame template image from the adjusted current frame image, wherein the current frame template image is an image which is intercepted from the adjusted current frame image with an optical center point of the adjusted current frame image as a center and in a preset proportion to a size of the first template image.

Preferably, the image features include a histogram of oriented gradient (HOG) feature and a color name (CN) feature; and the step of training, by using the image features, the position filter and the scale filter of the first template image includes:
  training, by using the HOG feature and the CN feature, the position filter and the scale filter of the first template image.

Preferably, the step of predicting, according to the position filter and the scale filter, the position information of the first template image in the next frame image of the preset takeoff and landing point includes:
  acquiring the next frame image of the preset takeoff and landing point, and adjusting the next frame image to acquire a next frame template image;

calculating, according to the position filter, a maximum response position of the first template image in the next frame template image;

calculating, according to the scale filter, a maximum response scale of the first template image in the next frame template image; and determining, according to the maximum response position and the maximum response scale, the position information of the first template image in the next frame image.

Preferably, the step of controlling, according to the position information, the aircraft to land includes:

calculating three-dimensional coordinates of the position information in a world coordinate system; and controlling, according to the three-dimensional coordinates, the aircraft to land.

The present invention further provides an aircraft, including:

a memory and a processor, wherein the memory is configured to store a computer-executable landing control program; and the processor is configured to call the computer-executable landing control program to implement the foregoing landing control method.

The present invention further provides a memory medium, wherein the storage medium is configured to store a computer-executable landing control program therein; and the processor, when calling the landing control program, can execute the foregoing landing control method.

Compared with the prior art, the present invention is characterized in that the first image of the preset takeoff and landing point collected at the first preset height and the first attitude information of the aircraft when the first image is collected are acquired, such that the first template image of the preset takeoff and landing point is acquired by using the first image and the first attitude information, and the first template image is used as a tracking object. When the aircraft needs to land, the current frame image of the preset takeoff and landing point collected at the second preset height during a landing process and the second attitude information corresponding to the aircraft when the current frame image is collected are acquired, the second preset height being greater than the first preset height. The current frame image is adjusted according to the first template image and the second attitude information to acquire the current frame template image.

That is, the current frame template image is subjected to image feature extraction, and the extracted image features are used to train the position filter and the scale filter of the first template image; the position information of the first template image in the next frame image is predicted by using the position filter and the scale filter; and the landing of the aircraft is corrected by using the position information, such that the aircraft can dynamically track the preset takeoff and landing point for landing, so as to realize the accurate landing of the aircraft.

DETAILED DESCRIPTION

Figure 1:
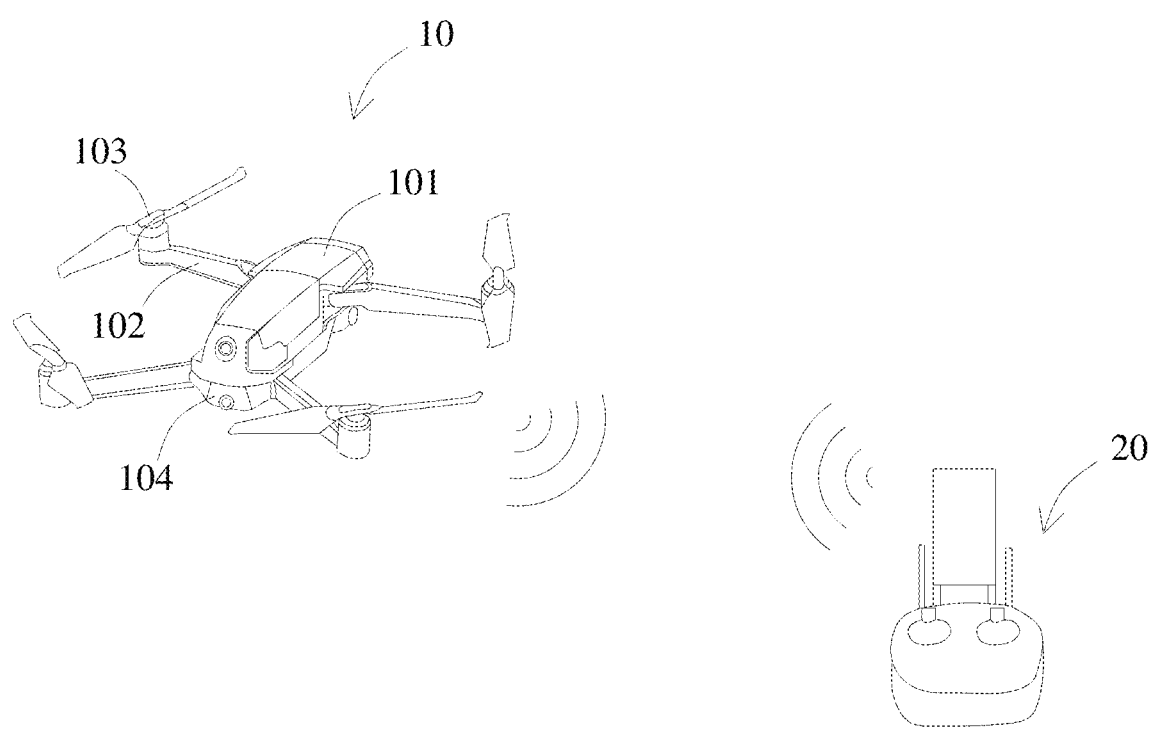
FIG. 1 is a stereoscopic structural diagram of an aircraft provided by an embodiment of the present invention.

In order to make the objectives, technical solutions and advantages of the present invention clearer, the following will describe the present invention in detail in conjunction with accompany drawings and embodiments. It should be understood that the specific embodiments described here are only used to explain the present invention, but not used to limit the present invention. Based on the embodiments of the present invention, all other embodiments derived by a person of ordinary skill in the art without creative efforts shall fall within the protection scope of the present invention.

The terms "first", "second", "third", "fourth" and the like in the description and claims, as well as the above-mentioned drawings, of the present application are configured to distinguish similar objects, but not necessarily used to describe a specific order or precedence order. It should be understood that data used in this way may be interchanged where appropriate so that the embodiments described herein can be implemented in a sequence other than those illustrated or described herein. Furthermore, the terms "including" and "having" and any variants thereof are intended to cover non-exclusive inclusions. For example, a process, method, system, product, or device that includes a series of steps or units is not necessarily limited to those steps or units that are clearly listed, but may include other steps or units that are not clearly listed or are inherent to such processes, methods, products, or devices.

It should be noted that the terms "first", "second", and the like involved in the present invention are only for the purpose of description and should not be construed as indicating or implying relative importance or implicitly indicating the number of technical features indicated. Thus, the features defined by the terms "first" and "second" may include one or more of the features either explicitly or implicitly. Furthermore, the technical solutions of various embodiments may be combined with one another on the basis that the combination thereof can be realized by a person of ordinary skill in the art. When the combination of technical solutions conflicts or cannot be achieved, it should be considered that such a combination of technical solutions does not exist and does not fall within the protection scope claimed by the present invention.

The present invention provides a landing control method, an aircraft, and a storage medium. The landing control method is applied to the aircraft, and includes: acquiring a first image of a preset takeoff and landing point collected by the aircraft at a first preset height during a takeoff process, and first attitude information of the aircraft when the first image is collected; adjusting, according to the first attitude information, the first image to acquire a first template image of the preset takeoff and landing point; acquiring a current frame image of a preset takeoff and landing point collected by the aircraft at a second preset height during a landing process, and second attitude information corresponding to the aircraft when the current frame image is collected, the second preset height being greater than the first preset height; adjusting, according to the first template image and the second attitude information, the current frame image to acquire a current frame template image; extracting image features of the first template image from the current frame template image; training, by using the image features, a position filter and a scale filter of the first template image; predicting, according to the position filter and the scale filter, position information of the first template image in the next frame image of the preset takeoff and landing point; and controlling, according to the position information, the aircraft to land, such that the aircraft lands to the preset takeoff and landing point.

According to the present invention, the first image of the preset takeoff and landing point collected at the first preset height and the first attitude information of the aircraft when the first image is collected are acquired, such that the first template image of the preset takeoff and landing point is acquired by using the first image and the first attitude information, and the first template image is used as a tracking object. When the aircraft needs to land, the current frame image of the preset takeoff and landing point collected at the second preset height during a landing process and the second attitude information corresponding to the aircraft when the current frame image is collected are acquired, the second preset height being greater than the first preset height. The current frame image is adjusted according to the first template image and the second attitude information to acquire the current frame template image.

That is, the current frame template image is subjected to image feature extraction, and the extracted image features are used to train the position filter and the scale filter of the first template image; the position information of the first template image in the next frame image is predicted by using the position filter and the scale filter; and the landing of the aircraft is corrected by using the position information, such that the aircraft can dynamically track the preset takeoff and landing point for landing, so as to realize the accurate landing of the aircraft.

Referring to FIG. 1 in which the present invention provides an aircraft 10, the aircraft 10 is communicatively connected to a terminal device 20. The aircraft 10 may be a rotor aircraft, such as a quad-rotor aircraft, a hexa-rotor aircraft, or a fixed-wing aircraft. The terminal device 20 is configured to send a control instruction to the aircraft 10 to control the aircraft 10. The terminal device 10 may be a remote controller or a smart phone.

The aircraft 10 includes a fuselage 101, arms 102, a power component 103, a control component (not shown) and an image capturing apparatus 104. The control component may be configured to receive a response instruction sent by the terminal device 20 and generate a corresponding control signal according to the response instruction to control the aircraft 10 to perform corresponding operations, such as controlling the action of the power component 103 to adjust a flight attitude or control the image capturing apparatus 104 to capture images. The arms 102 are connected to the fuselage 101, and the power component 103 is disposed on the arms 102, electrically connected to the control component and configured to provide flying power for the aircraft 10. The image capturing apparatus 104 is disposed on the fuselage 101, electrically connected to the control component and configured to acquire image or video information.

Figure 2:
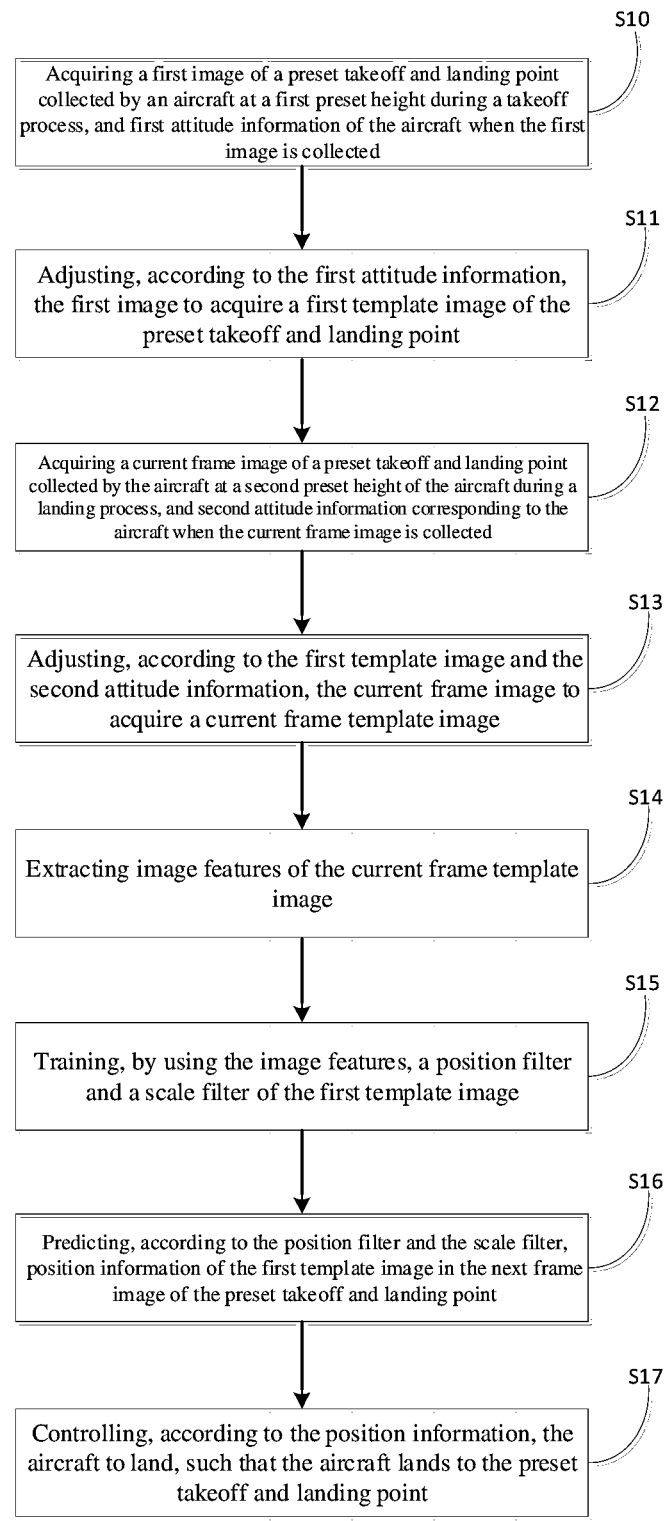
FIG. 2 is a flowchart of steps of a landing control method provided by an embodiment of the present invention.

Referring to FIG. 2 in which the present invention provides a landing control method, this method is applied to an aircraft 10 and includes the following steps S10 to S17.

In S10, a first image of a preset takeoff and landing point collected by the aircraft at a first preset height during a takeoff process and first attitude information of the aircraft when the first image is collected are acquired.

Figure 3:
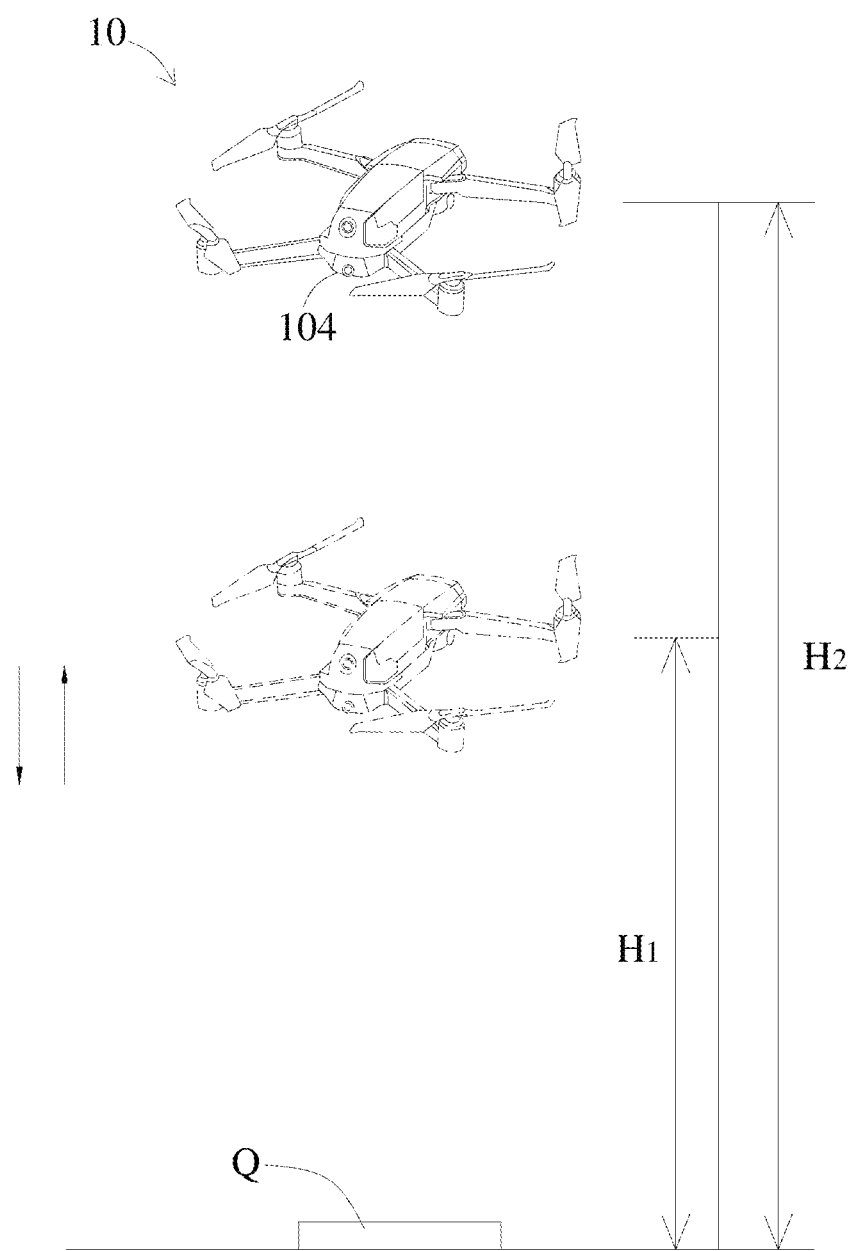
FIG. 3 is a schematic diagram of acquiring an image of a preset takeoff and landing point when the aircraft reaches a preset height during the takeoff and landing process.

As shown in FIG. 3, the aircraft 10, when taking off to a first preset height H1, acquires a first image of a preset takeoff and landing point Q collected by the image capturing apparatus 104, and first attitude information of the aircraft when the first image is collected, wherein the first attitude information includes first attitude information and first position information.

In some embodiments, the step of acquiring the first image of the preset takeoff and landing point collected by the aircraft during the takeoff process, and the first attitude information of the aircraft when the first image is collected includes:

acquiring, at every preset flight height, the first image of the preset takeoff and landing point collected by the aircraft during the takeoff process, and the first attitude information of the aircraft when the first image is collected, wherein the preset flight height can be set as required.

In some embodiments, the method further includes:

stopping the collection of the first image and the first attitude information when the current flight height of the aircraft is greater than a preset height; and adjusting, according to the first attitude information, the first image to acquire a first template image of the preset takeoff and landing point.

In S11, the first image is adjusted according to the first attitude information to acquire the first template image of the preset takeoff and landing point.

Figure 4A:
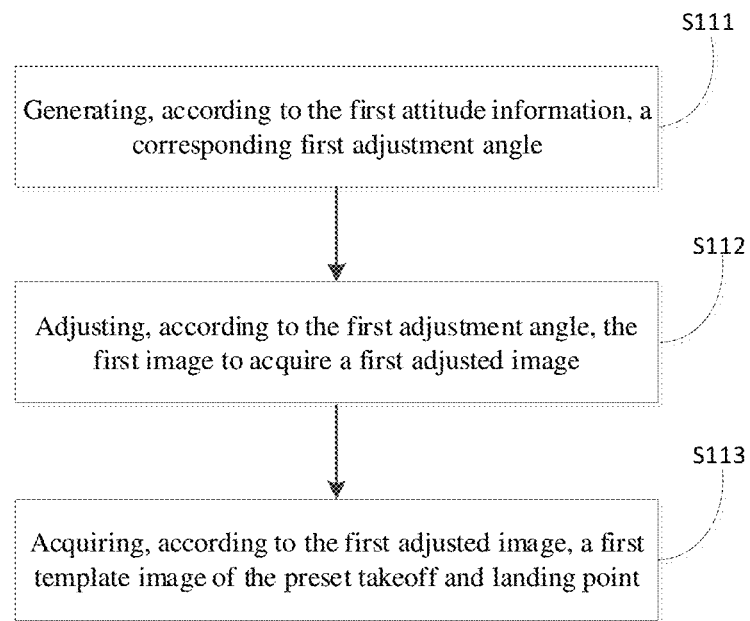
FIG. 4A is a step flowchart in an embodiment of step S11 in FIG. 2.

Referring to FIG. 4A, in some embodiments, the step S11 includes:

S111: generating, according to the first attitude information, a corresponding first adjustment angle;

S112: adjusting, according to the first adjustment angle, the first image to acquire a first adjusted image; and S113: acquiring, according to the first adjusted image, the first template image of the preset takeoff and landing point, wherein the first template image is an image of a preset area in the first adjusted image intercepted with an optical center point of the first adjusted image as a center point.

Figure 4B:
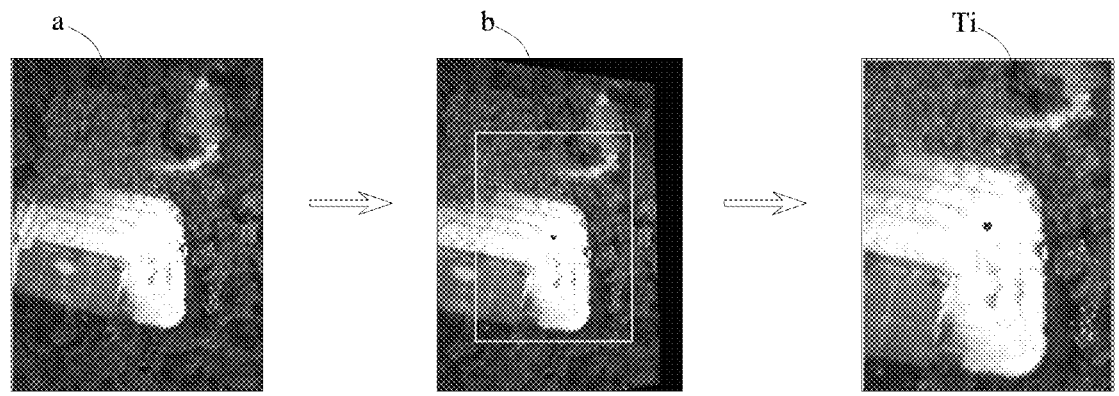
FIG. 4B is a schematic diagram of image changes after the aircraft adjusts an acquired image.

Exemplarily, as shown in FIG. 4B, when the aircraft 10 acquires a first image a, since the image of the preset takeoff and landing point Q captured at a flight attitude angle is not a horizontal image in the strict sense, in order to acquire the horizontal image of the preset takeoff and landing point Q more accurately, an attitude angle of the aircraft 10 in the image capturing process is acquired from the first attitude information according to the first attitude information when the aircraft 10 acquires the first image a; and then, the first image a is subjected to angle compensation and adjustment by taking the attitude angle as the first adjustment angle, thereby acquiring a first adjusted image b. At the same time, an image within a preset range is intercepted with an optical center point of the first adjusted image b as a center point to acquire a first template image Ti. The first template image Ti is an image of the preset takeoff and landing point Q acquired by the aircraft 10 at the first preset height H1. When the height of the aircraft 10 is greater than H1, and the aircraft 10 needs to land precisely to the preset takeoff and landing point Q, the first template image Ti may be used as a tracking target, and the image of the preset takeoff and landing point Q can be acquired in real time, such that the position of the first template image Ti can be tracked in the image of the preset takeoff and landing point Q acquired in real time, so as to realize the accurate landing of the aircraft.

In S12, a current frame image of the preset takeoff and landing point collected by the aircraft at a second preset height during a landing process and second attitude information corresponding to the aircraft when the current frame image is collected are acquired, the second preset height being greater than the first preset height.

As shown in FIG. 3, the current frame image of the preset takeoff and landing point collected by the aircraft 10 at the second preset height H2 during the landing process and the second attitude information corresponding to the aircraft when the current frame image is collected are acquired, the second preset height H2 being greater than the first preset height H1.

For example, H1 may be 15 m, and H2 may be 25 m; or H1 may be 6 m, and H2 may be 15 m; or H1 may be 1 m, and H2 may be 6 m.

In S13, the current frame image is adjusted according to the first template image and the second attitude information to acquire a current frame template image.

Figure 5:
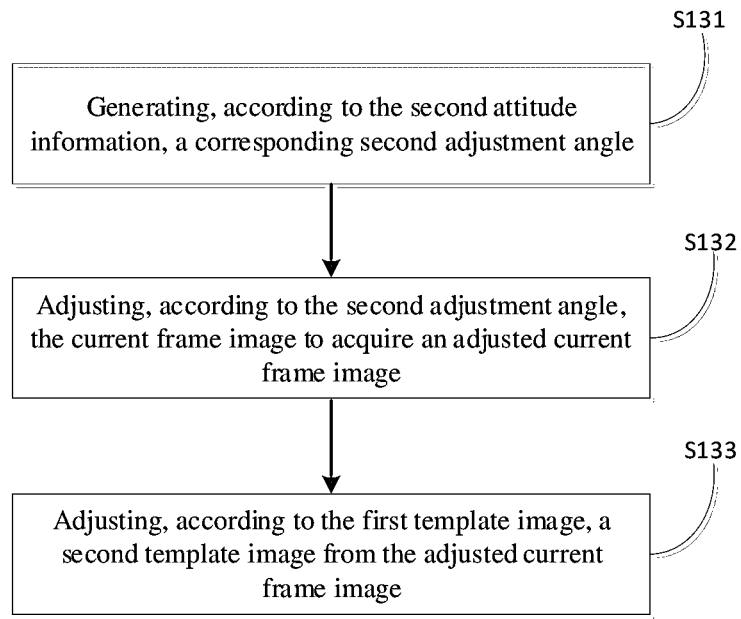
FIG. 5 is a step flowchart in an embodiment of step S13 in FIG. 2.

Referring to FIG. 5A, in some embodiments, the step S13 includes:

S131: generating, according to the second attitude information, a corresponding second adjustment angle;

S132: adjusting, according to the second adjustment angle, the current frame image to acquire an adjusted current frame image; and S133: acquiring, according to the first template image, a second template image from the adjusted current frame image, wherein the second template image is an image which is intercepted from the adjusted current frame image with an optical center point of the adjusted current frame image as a center and is in a preset proportion to a size of the first template image.

Exemplarily, when the aircraft 10 acquires the current frame image of the preset takeoff and landing point Q, since the current frame image of the preset takeoff and landing point Q captured at a flight attitude angle is not a horizontal image in the strict sense, in order to acquire a horizontal image of the current frame image of the preset takeoff and landing point Q more accurately, an attitude angle of the aircraft 10 in the image capturing process is acquired from the second attitude information according to the second attitude information when the aircraft 10 acquires the current frame image; and then, the current frame image is subjected to angle compensation and adjustment by taking the attitude angle as the second adjustment angle, thereby acquiring the adjusted current frame image. At the same time, an image which is intercepted from the adjusted current frame image with an optical center point of the adjusted current frame image as a center and is in a preset proportion to a size of the first template image Ti is used as a current frame template image It, wherein the preset proportion may reside in that: a size S1 of the first template image Ti and a size S2 of the current frame template image It satisfy: S1/S2=H1/H2.

In S14, image features of the current frame template image are extracted.

A plurality of sample images is collected in four different mutually perpendicular directions around the current frame template image, and sample images of the current frame template image in different sizes are collected.

The image features are extracted from the plurality of collected sample images, wherein the image features include a HOT feature and a CN feature.

In S15, a position filter and a scale filter of the first template image are trained by using the image features.

An objective function of the position filter and an objective function of the scale filter are set, wherein the position filter of the first template image is established by using the acquired image feature and the objective function of the position filter, and the scale filter of the first template image is established by using the acquired image feature and the objective function of the scale filter.

In S16, position information of the first template image in the next frame image of the preset takeoff and landing point is predicted according to the position filter and the scale filter.

Figure 6:
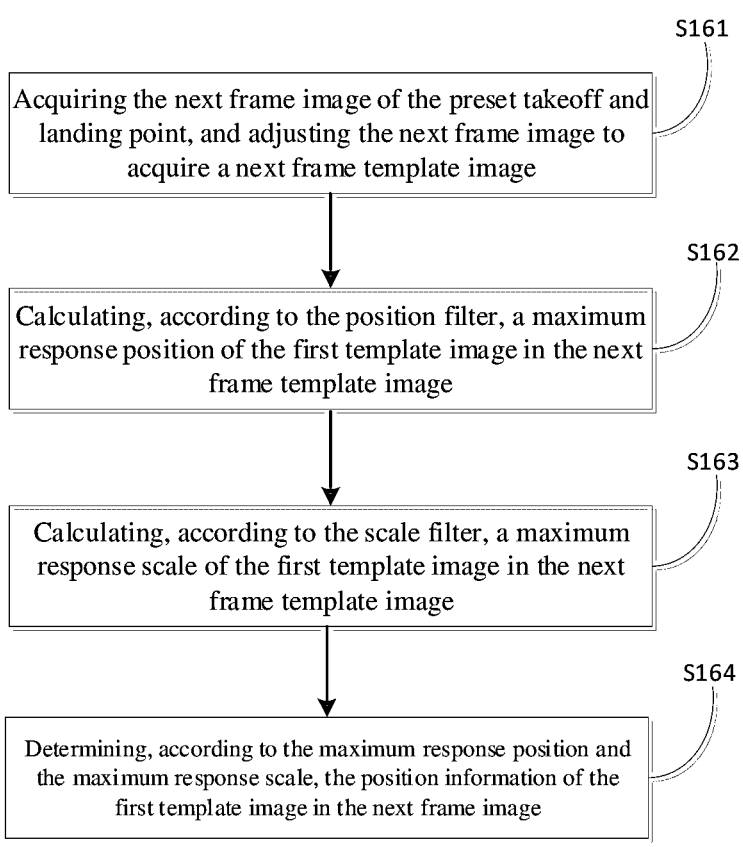
FIG. 6 is a step flowchart in an embodiment of step S16 in FIG. 2.

Referring to FIG. 6, in some embodiments, the step S16 includes:

S161: acquiring the next frame image of the preset takeoff and landing point, and adjusting the next frame image to acquire a next frame template image;

S162: calculating, according to the position filter, a maximum response position of the first template image in the next frame template image;

S163: calculating, according to the scale filter, a maximum response scale of the first template image in the next frame template image; and S164: determining, according to the maximum response position and the maximum response scale, the position information of the first template image in the next frame image.

The step of adjusting the next frame image to acquire the next frame template image includes:

acquiring third attitude information of the aircraft when the aircraft collects the next frame image of the preset takeoff and landing point; and adjusting, according to the third attitude information, the next frame image to acquire the next frame template image.

Exemplarily, the next frame image of the preset takeoff and landing point and the third attitude information of the aircraft 10 when the aircraft 10 acquires the next frame image are acquired, and the next frame image is adjusted according to the third attitude information to acquire the next frame template image. The maximum response position of the first template image in the next frame template image is calculated according to the position filter. Pictures of different scales are collected by taking the maximum response position as a center, and the maximum response scale of the first template image in the next frame template image is calculated by using the scale filter. The position information of the first template image in the next frame image is determined by using the maximum response position and the maximum response scale, wherein the position information is coordinates of an optical center point of the first template image in the next frame image.

In S17, the aircraft is controlled according to the position information to land, such that the aircraft lands to the preset takeoff and landing point.

In some embodiments, the step S17 includes:

calculating three-dimensional coordinates of the position information in a world coordinate system; and controlling, according to the three-dimensional coordinates, the aircraft to land.

Figure 7:
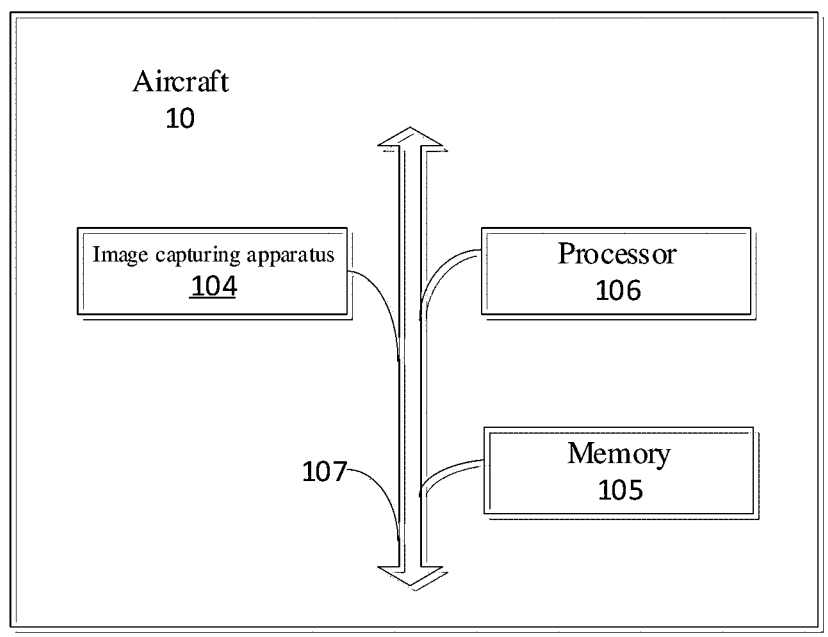
FIG. 7 is a schematic structure flowchart of an aircraft provided by an embodiment of the present invention.

Referring to FIG. 7, in some embodiments, the aircraft 10 also includes a memory 105, a processor 106 and a bus 107, wherein the memory 105 is electrically connected to the processor 106 through the bus 107.

The memory 105 includes at least one type of readable storage medium, the readable storage medium including a flash memory, a hard disk, a multimedia card, a card-type memory (e.g., SD or DX memory), a magnetic memory, a magnetic disk, an optical disk, and the like. In some embodiments, the memory 105 may be an internal storage unit of the aircraft 10, such as a hard disk of the aircraft 10. In other embodiments, the memory 105 may also be an external storage device of the aircraft 10, such as a pluggable hard disk, a smart media card (SMC), a secure digital (SD) card or a flash card equipped on the aircraft 10. The memory 105 may be configured not only to store application software installed in the aircraft 10 and various data, such as computer-readable codes of a landing control method program, etc., but also to temporarily store data that has been output or is to be output.

In some embodiments, the processor 106 may be a central processing unit (CPU), a controller, a microcontroller, a microprocessor or other data processing chip, and the processor 106 may call program codes or process data stored in the memory 105 to execute the foregoing landing control method.

The present invention further provides a memory medium, wherein the storage medium is configured to store a computer-executable landing control program therein; and the processor, when calling the landing control program, can execute the foregoing landing control method.

The above are only the preferred embodiments of the present invention, and are not intended to limit the patent scope of the present invention. Any equivalent structure or equivalent process transformation made by using the contents of the description and drawings of the present invention, or directly or indirectly applied in other related technical fields, are similarly included in the scope of patent protection of the present invention.

The invention claimed is:

1. A landing control method, which is applied to an aircraft and comprises:
    acquiring a first image of a preset takeoff and landing point collected by the aircraft at a first preset height during a takeoff process, and first attitude information of the aircraft when the first image is collected;
    adjusting, according to the first attitude information, the first image to acquire a first template image of the preset takeoff and landing point;
    acquiring a current frame image of the preset takeoff and landing point collected by the aircraft at a second preset height during a landing process, and second attitude information corresponding to the aircraft when the current frame image is collected, the second preset height being greater than the first preset height;
    adjusting, according to the first template image and the second attitude information, the current frame image to acquire a current frame template image;
    extracting image features of the current frame template image;
    training, by using the image features, a position filter and a scale filter of the first template image;
    predicting, according to the position filter and the scale filter, position information of the first template image in the next frame image of the preset takeoff and landing point; and
    controlling, according to the position information, the aircraft to land, such that the aircraft lands to the preset takeoff and landing point.

2. The method according to claim 1, wherein the step of acquiring the first image of the preset takeoff and landing point collected by the aircraft during the takeoff process, and the first attitude information of the aircraft when the first image is collected, comprises:
    acquiring, at every preset flight height, the first image of the preset takeoff and landing point collected by the aircraft during the takeoff process, and the first attitude information of the aircraft when the first image is collected.

3. The method according to claim 2, further comprising:
    stopping the collection of the first image and the first attitude information when the current flight height of the aircraft is greater than a preset height.

4. The method according to claim 1, wherein the step of adjusting, according to the first attitude information, the first image to acquire the first template image of the preset takeoff and landing point comprises:
    generating, according to the first attitude information, a corresponding first adjustment angle;
    adjusting, according to the first adjustment angle, the first image to acquire a first adjusted image; and
    acquiring, according to the first adjusted image, the first template image of the preset takeoff and landing point, wherein the first template image is an image of a preset area in the first adjusted image intercepted with an optical center point of the first adjusted image as a center point.

5. The method according to claim 4, wherein the step of adjusting, according to the first template image and the second attitude information, the current frame image to acquire the current frame template image comprises:
    generating, according to the second attitude information, a corresponding second adjustment angle;
    adjusting, according to the second adjustment angle, the current frame image to acquire an adjusted current frame image; and
    acquiring, according to the first template image, the current frame template image from the adjusted current frame image, wherein the current frame template image is an image which is intercepted from the adjusted current frame image with an optical center point of the adjusted current frame image as a center and is in a preset proportion to a size of the first template image.

6. The method according to claim 1, wherein the image features include a HOG feature and a CN feature; and the step of training, by using the image features, the position filter and the scale filter of the first template image comprises:
    training, by using the HOG feature and the CN feature, the position filter and the scale filter of the first template image.

7. The method according to claim 6, wherein the step of predicting, according to the position filter and the scale filter, the position information of the first template image in the next frame image of the preset takeoff and landing point comprises:
    acquiring the next frame image of the preset takeoff and landing point, and adjusting the next frame image to acquire a next frame template image;
    calculating, according to the position filter, a maximum response position of the first template image in the next frame template image;
    calculating, according to the scale filter, a maximum response scale of the first template image in the next frame template image; and
    determining, according to the maximum response position and the maximum response scale, the position information of the first template image in the next frame image.

8. The method according to claim 1, wherein the step of controlling, according to the position information, the aircraft to land comprises:
    calculating three-dimensional coordinates of the position information in a world coordinate system; and
    controlling, according to the three-dimensional coordinates, the aircraft to land.

9. An aircraft, comprising: at least one processor; and
a memory communicatively connected to the at least one processor, wherein
the memory stores instructions executable by the at least one processor and the instructions are executed by the at least one processor to enable the at least one processor to execute:
acquiring a first image of a preset takeoff and landing point collected by the aircraft at a first preset height during a takeoff process, and first attitude information of the aircraft when the first image is collected;
adjusting, according to the first attitude information, the first image to acquire a first template image of the preset takeoff and landing point;
acquiring a current frame image of the preset takeoff and landing point collected by the aircraft at a second preset height during a landing process, and second attitude information corresponding to the aircraft when the current frame image is collected, the second preset height being greater than the first preset height;
adjusting, according to the first template image and the second attitude information, the current frame image to acquire a current frame template image;
extracting image features of the current frame template image;
training, by using the image features, a position filter and a scale filter of the first template image;
predicting, according to the position filter and the scale filter, position information of the first template image in the next frame image of the preset takeoff and landing point; and
controlling, according to the position information, the aircraft to land, such that the aircraft lands to the preset takeoff and landing point.

10. The aircraft according to claim 9, wherein the at least one processor is further configured to:
acquire, at every preset flight height, the first image of the preset takeoff and landing point collected by the aircraft during the takeoff process, and the first attitude information of the aircraft when the first image is collected.

11. The aircraft according to claim 10, wherein the at least one processor is further configured to:
stop the collection of the first image and the first attitude information when the current flight height of the aircraft is greater than a preset height.

12. The aircraft according to claim 9, wherein the at least one processor is further configured to:
generate, according to the first attitude information, a corresponding first adjustment angle;
adjust, according to the first adjustment angle, the first image to acquire a first adjusted image; and
acquire, according to the first adjusted image, the first template image of the preset takeoff and landing point, wherein the first template image is an image of a preset area in the first adjusted image intercepted with an optical center point of the first adjusted image as a center point.

13. The aircraft according to claim 12, wherein the at least one processor is further configured to:
generate, according to the second attitude information, a corresponding second adjustment angle;
adjust, according to the second adjustment angle, the current frame image to acquire an adjusted current frame image; and
acquire, according to the first template image, the current frame template image from the adjusted current frame image, wherein the current frame template image is an image which is intercepted from the adjusted current frame image with an optical center point of the adjusted current frame image as a center and is in a preset proportion to a size of the first template image.

14. The aircraft according to claim 9, wherein the image features include a HOG feature and a CN feature; and wherein the at least one processor is further configured to:
train, by using the HOG feature and the CN feature, the position filter and the scale filter of the first template image.

15. The aircraft according to claim 14, wherein the at least one processor is further configured to:
acquire the next frame image of the preset takeoff and landing point, and adjusting the next frame image to acquire a next frame template image;
calculate, according to the position filter, a maximum response position of the first template image in the next frame template image;
calculate, according to the scale filter, a maximum response scale of the first template image in the next frame template image; and
determine, according to the maximum response position and the maximum response scale, the position information of the first template image in the next frame image.

16. The aircraft according to claim 9, wherein the at least one processor is further configured to:
calculate three-dimensional coordinates of the position information in a world coordinate system; and
control, according to the three-dimensional coordinates, the aircraft to land.

* * * * *